(12) United States Patent
Gedik et al.

(10) Patent No.: US 9,158,837 B2
(45) Date of Patent: Oct. 13, 2015

(54) METHODS AND APPARATUS FOR ADAPTIVE SOURCE FILTERING AND LOAD SHEDDING FOR DATA STREAM PROCESSING

(75) Inventors: Bugra Gedik, White Plains, NY (US); Kun-Lung Wu, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1593 days.

(21) Appl. No.: 11/870,099

(22) Filed: Oct. 10, 2007

(65) Prior Publication Data

US 2009/0100014 A1    Apr. 16, 2009

(51) Int. Cl.
*G06F 7/00* (2006.01)
*G06F 17/30* (2006.01)

(52) U.S. Cl.
CPC ...... *G06F 17/30657* (2013.01); *G06F 17/3066* (2013.01)

(58) Field of Classification Search
CPC .................. G06F 17/30657; G06F 17/3066
See application file for complete search history.

(56) References Cited

U.S. PATENT DOCUMENTS

| | | | | |
|---|---|---|---|---|
| 5,317,730 A * | 5/1994 | Moore et al. | ............... | 707/100 |
| 6,310,566 B1 * | 10/2001 | McNeely | ............... | 341/123 |
| 7,123,652 B1 * | 10/2006 | McNeely | ............... | 375/232 |
| 7,493,346 B2 * | 2/2009 | Chi et al. | ............... | 707/200 |
| 7,571,188 B1 * | 8/2009 | Schwetman et al. | ........ | 707/104.1 |
| 2002/0033765 A1 * | 3/2002 | Bickert et al. | ............... | 342/162 |
| 2002/0119796 A1 * | 8/2002 | Vanghi | ............... | 455/522 |
| 2003/0149495 A1 * | 8/2003 | Hodges | ............... | 700/67 |
| 2005/0092825 A1 * | 5/2005 | Cox et al. | ............... | 235/375 |
| 2006/0074996 A1 * | 4/2006 | Corbett et al. | ............... | 707/201 |
| 2006/0184527 A1 * | 8/2006 | Chi et al. | ............... | 707/7 |
| 2007/0260602 A1 * | 11/2007 | Taylor | ............... | 707/6 |
| 2008/0071818 A1 * | 3/2008 | Apanowicz et al. | ...... | 707/101 |
| 2008/0304516 A1 * | 12/2008 | Feng et al. | ............... | 370/468 |
| 2009/0063429 A1 * | 3/2009 | Rudolph | ............... | 707/3 |
| 2009/0077056 A1 * | 3/2009 | Ravikumar et al. | ...... | 707/5 |
| 2009/0187584 A1 * | 7/2009 | Johnson et al. | ............... | 707/100 |

OTHER PUBLICATIONS

K-L. Wu et al., "Query Indexing with Containment-Encoded Intervals for Efficient Stream Processing," pp. 1-28.
N. Jain et al., "Design, Implementation, and Evaluation of the Linear Road Benchmark on the Stream Processing Core," SIGMOD, Jun. 2006, pp. 431-442.
L. Liu et al., "Continual Queries for Internet Scale Event-Driven Information Delivery," IEEE Transactions on Knowledge and Data Engineering, Jul./Aug. 1999, pp. 610-628, vol. 11, No. 4.

* cited by examiner

*Primary Examiner* — Taelor Kim
(74) *Attorney, Agent, or Firm* — Jeff Tang; Ryan, Mason & Lewis, LLP

(57) ABSTRACT

Techniques are disclosed for adaptive source filtering and load shedding in such data stream processing systems. For example, in one aspect of the invention, a method for use in filtering data in a distributed data stream processing system, wherein a server receives and processes one or more data streams from one or more data sources, comprises the steps of the server periodically re-configuring one or more filters and sending the one or more periodically re-configured filters to the one or more data sources, and the one or more data sources performing data filtering based on the one or more periodically re-configured filters received from the server.

20 Claims, 5 Drawing Sheets

FIG. 1

FILTER​ ​ ​ UNIFORM SIFTER FILTER​ ​ ​ NONUNIFORM SIFTER FILTER

FIG. 3

$$\text{maximize} \quad V^*(Q) = B' - \sum_{S_i \in S} A(S_i) \cdot d(S_i) \quad (10)$$

$$\text{subject to} \quad 1 - z = \sum_{S_i \in S} d(S_i) \cdot f(S_i)$$

$$\forall \{S_i, S_j\} \subset S, \ |d(S_i) - d(S_j)| \leq \Delta$$
$$Q(S_i) \neq \emptyset \wedge Q(S_j) \neq \emptyset$$

Alogrithm 1: Flexible partitioning with QDPart
$S \leftarrow \text{FLEX\_QDPART}(l, U, n)$
Input: $l$ is the number of sifter regions needed, $U$ is the sample data items, $n$ is the number of dimensions
Output: $S$ is the set of $l$ sifter regions created
[We assume that the data space is normalized to $[0, 1]^n$]

(1)    $L$ : priority queue organized by benefit value of items
(2)    $P \leftarrow \langle reg = [0, 1]^n, itm = U, val = -1, bdp = 0, bdd = 0 \rangle$ [$P$ is the first item to insert into $L$. $P.reg$ is the region, $P.itm$ is the set of sample data items in $P.reg$. $P.val$ is the benefit value, $P.bdp$ is the best division point for $P.reg$. $P.bdp$ is the best division dimension for $P.reg$]
(3)    $\text{BENEFIT}(P)$; $\text{INSERT}(L, P_1)$ [Calculate the benefit value and associated best division point and direction for $P.reg$; then insert $P$ into $L$ (note: $P.reg$ the whole data domain)]
(4)    while $\text{SIZE}(L) \neq l$ [while more regions are needed]
(5)      $P \leftarrow \text{REMOVETOP}(L)$ [Get item with highest benefit]
(6)      $P_1 \leftarrow P_2 \leftarrow \langle reg = []^n, itm = \{\}, val = -1, bdp = 0, bdd = 0 \rangle$ [Initialize the next two items to be created from $P$]
(7)      $P_1.reg \leftarrow$ Lower part of $P.reg$ divided along $P.bdd$ at $P.bdp$
(8)      $P_2.reg \leftarrow$ Higher part of $P.reg$ divided along $P.bdd$ at $P.bdp$
(9)      $P_1.itm \leftarrow \{X : X \in P.itm \wedge P \in I_1\}$
(10)     $P_2.itm \leftarrow \{X : X \in P.itm \wedge P \in I_2\}$
(11)     $\text{BENEFIT}(P_1)$; $\text{INSERT}(L, P_1)$; $\text{BENEFIT}(P_2)$; $\text{INSERT}(L, P_2)$ [Calculate the benefit values and insert the newly created items into the priority queue $L$]
(12) $S \leftarrow \{R : R = P.reg \wedge P \in L\}$ [final set of sifter regions]

FIG. 4 cont.

CALCBENEFIT($P$ : <$reg, itm, val, bdp, bdd$>)
INPUT: $P$ is the item whose benefit is to be calculated
OUTPUT: $P.val$ is set to $P$'s benefit, $P.bdp$ is set to associated best division point, and $P.bdd$ is set to the best division dimension
(1) for $d = 1$ to $n$ [for each dimension]
(2)    SORT($P.itm, d$) [sort items based on dimension $d$]
(3)    $\langle i, v \rangle \leftarrow \langle argmax, max \rangle_{j \in [1.. |itm| -1]}$
       $SSE(hts(P.itm)) \cdot SSE(P.itm[d])$
       $-SSE(hts(P.itm), 1, j) \cdot SSE(P.itm[d], 1, j)$
       $-SSE(hts(P.itm), j+1, |P.itm|) \cdot SSE(P.itm[d], j+1, |P.itm|)$
       [The above step can be performed in $O(|itm|)$ time, since SSE can be calculated incrementally. $hts(P.itm)$ is the set of query hit values for the sample data items, $SSE(P.itm[d])$ is the set of $d$th dimension values of the sample data items.]
(4)    if $v > P.val$ [we have a better dimension to cut along]
(5)       $P.val = v$ [update the region value metric]
(6)       $p \leftarrow \frac{1}{2} \cdot (P.itm[d][i]) + P.itm[d][i])$ [calculate division point]
(7)       $P.bdp \leftarrow p; P.bdd \leftarrow d$ [set division point, and dimension]

METHODS AND APPARATUS FOR ADAPTIVE SOURCE FILTERING AND LOAD SHEDDING FOR DATA STREAM PROCESSING

This invention was made with Government support under Contract No.: H98230-05-3-0001 awarded by the Department of Defense. The Government has certain rights in this invention.

FIELD OF THE INVENTION

The present application relates to data stream processing systems and, more particularly, to techniques for adaptive source filtering and load shedding in such data stream processing systems.

BACKGROUND OF THE INVENTION

The ever increasing rate of digital information available from on-line sources drives the need for building information monitoring applications to assist users in tracking relevant changes and accessing information that is of interest to them in a timely manner. This growth in the amount of digital information available is partly due to the emergence of a wide and growing range of network-connected hard and soft sensors. These on-line sources are increasingly taking the form of data streams, i.e., time-ordered series of events or readings. Some examples include network statistics, financial tickers, and environmental sensor readings. Continuous Query (CQ) systems (see, e.g., L. Liu et al., "Continual Queries for Internet Scale Event-driven Information Delivery," IEEE Transactions on Data and Knowledge Engineering, TKDE, July/August 1999) that can evaluate standing queries over data streams are used to integrate these sources into today's information processing tasks, and have led to the development of more comprehensive Data Stream Management Systems or DSMSs (see, e.g., N. Jain et al., "Design, Implementation, and Evaluation of the Linear Road Benchmark on the Stream Processing Core," Proceedings of ACM SIGMOD, 2006).

In the present application, we address a fundamental problem in stream-based CQ systems, namely adaptive source filtering and load shedding. With a large number of high-volume source streams and soaring data rates at peak times, stream processing systems demand adaptive load shedding. Otherwise, the CQ server may randomly drop data items when data arrival rates exceed the capacity of the CQ server to handle them, which could significantly degrade the quality of the query results.

To mitigate this problem, filtering can be applied to reduce the amount of data fed into a CQ server. In general, the high-level CQs installed in a stream processing system are not interested in receiving the entire source streams. Hence, a set of predicates can be defined in the data space to specify which portions of the source streams are needed by each CQ. Such predicates can be maintained by a query index to filter out the stream elements that are irrelevant (see, e.g., K.-L. Wu et al., "Query Indexing with Containment-encoded Intervals for Efficient Stream Processing," Springer Knowledge and Information Systems, KAIS, January 2006). However, it would not be effective in load reduction if such query indexes are maintained at the CQ server, because the data items are still received from the source nodes and processed against the query index by the CQ server.

A common approach to addressing this problem in distributed data processing is to move filtering close to the data sources, i.e., source filtering. With source filtering, only the relevant data items matching the predicates will be received and processed by the CQ server. However, there is a challenge with such a source filtering approach. Source nodes are usually computationally less powerful sensor nodes. Hence, shipping the complete query index to the source nodes is usually not possible or is performance-wise undesirable. As a result, a compact summary representation of the query index is often needed to perform effective source filtering. Note that the term "query" typically refers to the predicates in the query index that define the interested portions of the source streams, and "filter" typically refers to the summary structure shipped to the source nodes for filtering out the irrelevant or less useful data items.

Yet, source filtering in itself is not sufficient to prevent the CQ server from randomly dropping data items, even though source filtering can reduce the server's load. This is because the amount of data matching the predicates defined by the source filters can still surpass the capacity of the CQ server. For instance, a CQ with a low selective predicate can easily overwhelm the CQ server even with source filtering.

Hence, intelligent source filters are needed that perform adaptive load shedding on data items that match predicates.

SUMMARY OF THE INVENTION

Principles of the invention provide techniques for adaptive source filtering and load shedding in such data stream processing systems.

For example, in one aspect of the invention, a method for use in filtering data in a distributed data stream processing system, wherein a server receives and processes one or more data streams from one or more data sources, comprises the steps of the server periodically re-configuring one or more filters and sending the one or more periodically re-configured filters to the one or more data sources, and the one or more data sources performing data filtering based on the one or more periodically re-configured filters received from the server.

The step of the server periodically re-configuring the one or more filters may further comprise the steps of defining one or more non-overlapping regions of a data space associated with at least one of the one or more filters, and determining a drop threshold for each of the one or more non-overlapping regions within the filter.

The step of the server defining one or more non-overlapping regions of the data space for the filter may further comprises the step of partitioning the data space of the filter into a given number of regions.

The given number of regions may be equally sized. Alternatively, for the given number of regions, a data frequency may be the same, or a query density may be the same, or a partition benefit may be maximized.

The step of the server determining a drop threshold for each region within the filter may further comprises the steps of consolidating queries intersecting each filter region into one QoS (quality-of-service) value region, and formulating the drop threshold determination step into an optimization problem.

The step of consolidating queries may further comprise the steps of decomposing the QoS value of each query into one or more additive components, each component per intersected filter region, and, for each filter region, consolidating the QoS components of different queries that intersect the region into a single QoS value.

The step of formulating the optimization problem may further comprise the steps of setting an objective function to an aggregate of the QoS values of the region, and setting constraints such that the total fraction of a load shed using the drop thresholds equals a pre-calculated throttler value.

The throttler value may be pre-calculated by the steps of monitoring a system utilization since a last adaptation step, monitoring a fraction of dropped data items, and using the monitoring steps to compute a fraction of the load that can be handled, wherein the computed fraction is the throttler value.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Principles of the invention address the problem of adaptive source filtering and load shedding in data stream processing, where high-volume source streams, coupled with fluctuating rates, necessitate adaptive load shedding. When ignored, a continual query (CQ) server may randomly drop data items when its capacity is not enough to handle the arriving data, significantly reducing the quality of the query results. To alleviate this problem, filters can be applied at the source nodes to reduce the amount of data fed into the CQ server. However, source filtering in itself is not sufficient to prevent random dropping because the amount of data passing through the filters can still surpass the server's capacity. In accordance with principles of the invention, intelligent load shedding can be applied to minimize the degradation in the quality of the query results. We introduce a novel type of load-shedding source filter, referred to herein as a non-uniformly regulated (NR) sifter. An NR sifter judiciously applies varying amounts of load shedding to different regions of the data space within the sifter. In other words, an NR sifter regulates varying degrees of filtering for different regions of the data space defined by the sifter, thus the adjective "non-uniformly regulated." An NR sifter aims to shed enough load to prevent random dropping, while simultaneously maximizing the overall quality of the query results.

Similar to a basic filter, an NR sifter drops data items that do not match the predicates of any queries. More importantly, unlike a basic filter, an NR sifter can also drop data items that do match the predicates, which may impact the quality of the query results, in order to shed load, if needed, beyond what can be achieved with a basic filter. Without sifters, any additional load can only be shed by the CQ server via random dropping when the amount of data passing through the source filters exceed the CQ capacity to handle them.

To see an advantage and importance of the NR-sifter type of filter, consider a sub-region of the whole data space that has a large number of queries defined but only a small volume of data coming in. Obviously, this sub-region is not a good choice for performing load shedding. Dropping data items from this region will only bring a small reduction in the load, but it is at the cost of a significant reduction in the quality of the query results. Conversely, a sub-region that contains a small number of queries but a large volume of data coming in is a good choice for performing load shedding. Moreover, different queries in different sub-regions may have different quality-of-service (QoS) specifications, attesting to the need for applying varying amounts of load shedding for different regions of the data space. The NR sifters of the invention provide a way to perform differentiated load shedding along the data space, by taking query density, data density, and QoS specifications into consideration.

We formulate the problem of constructing NR sifters as an optimization problem. NR sifters are compact and quickly configurable, allowing frequent adaptations at the CQ server, and provide fast lookup for deciding if a data item should be dropped. We structure NR sifters as a set of (sifter region, drop threshold) pairs to achieve compactness, develop query consolidation techniques to enable quick construction, and introduce flexible space partitioning mechanisms to realize fast lookup.

Figure 1:
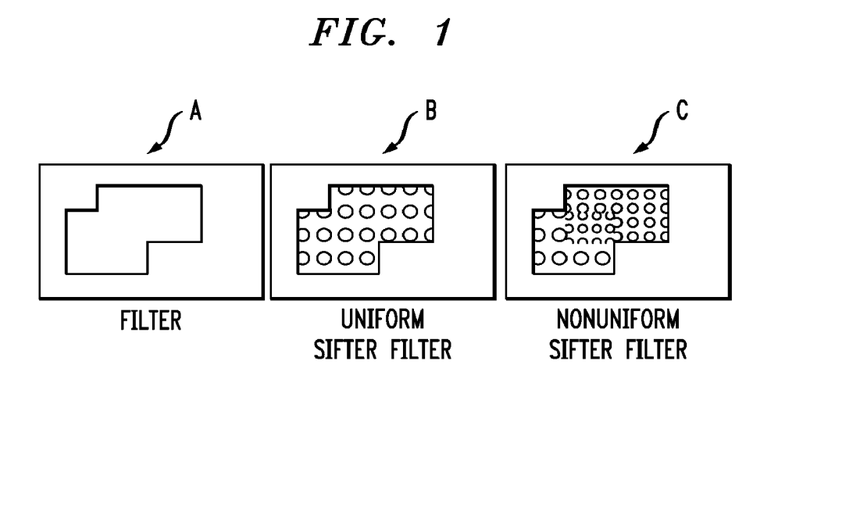
FIG. 1 illustrates the non-uniformly regulated sifter concept according to principles of the present invention.

FIG. 1 illustrates the concept of an NR sifter filter (denoted as C) and compares it to a regular filter (denoted as A) and a uniform sifter filter (denoted as B), for the special case of two dimensional data space. Note that in an NR sifter, different amount of load shedding can be applied to different parts of the data space, represented by variable-sized holes in the figure. The sizes of the holes and the shapes of the regions in an NR sifter filter are adaptively adjusted.

As will be explained below, we decompose the design problem of the NR sifter into two basic problems: partitioning and configuration. The former is used to define the structure of a filter, whereas the latter is used to define its load shedding characteristics. We develop efficient and optimal filter configuration techniques using the concepts of query consolidation and sifter regions. We propose several data space partitioning algorithms. We compare their performances under different workloads, and report partitioning algorithms that best benefit particular types of workloads.

For ease of reference, the remainder of the detailed description is organized as follows. Section 1 introduces the fundamentals and the notation used. Section 2 provides the basic problem definition. Section 3 gives the details of practical filter construction for QoS-aware load shedding. Section 4 introduces partitioning algorithms to be employed in filter construction. Section 5 describes rate adaptation. A number of extensions are introduced in Section 6. Section 7 describes an illustrative CQ server architecture.

1. Fundamentals and Notation

In this section, we describe the fundamentals of QoS-aware, NR sifter construction for stream processing systems, including the notation used herein, data model, query model, filter model, QoS-model, and finally operational model. These descriptions form the basis for formally defining the problem in the next section.

1.1 Data Model

We represent the streaming items as n-dimensional records. An item is denoted by X and is constituted of n values, denoted by $\langle x_1, \ldots, x_n \rangle$. $x_j, j \in [1..n]$, is a value from the domain $D_j$, which represents the jth dimension (attribute). We define $x_j \in D_j = [d'_j, d''_j]$, where $d'_j$ and $d''_j$ are the lower and upper bounds of the jth dimension, respectively. We denote the domain of the n-dimensional data item X by $\Delta$, and define $X \in D = D_1 \times \ldots \times D_n$. We consider multiple source nodes generating data streams with the same schema. We discus extensions to categorical attributes in Section 6.

1.2 Query Model

We denote the set of queries by Q. The ith query is denoted by $q_i$ and we have $q_i \in Q$, $i \in [1 \ldots |Q|]$. A query can specify any number of constraints in the form of <attribute> <op> <constant>, where <op>$\in \{=, \leq, \geq, <, >\}$, combined into a query expression using logical operators $\{\wedge, \vee, \neg\}$. For instance, for n=2, a query can be in the form of $\neg(x_1 \leq 4 \wedge (x_1 > 3 \vee x_2 \leq 5))$. In Section 3.4, we show that such queries can be converted into a set of n-dimensional range queries and can be processed by the system as independent range queries with proper modifications. As a result, from this point on we will assume that a query $q_i$ is associated with a range, which is an n-dimensional rectangle, denoted by $R(qi) \subset D$.

The query model can be extended to cover a broader class of queries, as long as each query can be represented as a sub-space of the n-dimensional data space corresponding to the domain $\Delta$. However, the practicality of the approach presented in herein depends on the computational simplicity of calculating the intersection of the subspace representing the query with an n-dimensional rectangle. Section 6 elaborates further on this issue and introduces other types of queries that can be supported within our inventive framework.

Each query also has an associated weight, denoted by $w_i$ for query $q_i$. This weight represents the relative importance of the query with respect to other queries in the system. Thus, the weights sum up to 1, i.e., $\Sigma_{q_i \in Q} w_i = 1$.

1.3 QoS Model

We enable each query to specify its QoS as a function of the result completeness. Completeness for query $q_i$ is defined as the fraction of the query result that was reported, and is denoted by $C(q_i)$. We have $C(q_i) \in [0, 1]$. In an ideal scenario where there is no processing overload, we have $\forall q_i \in Q$, $C(q_i) = 1$. As a result, the QoS of a query $q_i$, denoted by $V(q_i)$, is equal to 1 in this case. In general, we have $V(q_i) \in [0, 1]$. When some data items are dropped due to load shedding, completeness values of the queries decrease. We denote the decrease in the QoS per unit decrease in the completeness by $\alpha_i$, for query $q_i$. In other words, the QoS is a linear function of completeness. Thus, we have: $V(q_i) = \alpha_i \cdot C(q_i) + \beta_i$. Since we have $V(q_i) = 1$ when $C(q_i) = 1$, we also have $\beta_i = 1 - \alpha_i$. This strict structure imposed on the QoS functions is a design choice. It is one of the factors that enable us to construct the filters quickly, enabling faster adaptation (see Section 3.3).

1.4 Filter Model

We define a filter as a function $F:D \rightarrow [0, 1]$. Given a data item $X \in D$, $F(X)$ gives us the drop threshold for that item. The drop threshold defines the probability that item X will be dropped at the source, when filter F is applied. We define the process of determining whether a given data item X is to be dropped or passed under filter F, as a lookup operation. We list a number of desirable properties of an effective filter:

Compactness. The filter has to be compact, since it has to be transferred to the source nodes.

Fast Lookup. The filter has to provide fast lookup, so as not to limit the rate of source streams.

Lightweight Construction. The computation of the filter has to be a lightweight operation, in order to provide low-overhead and thus frequent adaptation.

Further elaborating on fast lookup, note that a filter F that assigns arbitrary and possibly distinct drop thresholds to distinct data items will require to use a random number generator at the source side to decide whether a given item should be dropped or not. This should be avoided, since it may result in consuming precious central processing unit (CPU) resources at the source nodes, especially for high volume source streams. Furthermore, we can argue that such a filter is less likely to be compact, since a simple closed form can not capture the data and query range distributions and relate them to the drop thresholds to produce an efficient filter. Ultimately, the construction of the filter will depend on the data and query range distributions as well as the QoS specifications, thus a too fine-grained filter will also fail to satisfy the lightweight construction property. Section 3 is dedicated to the construction of efficient filters that meet the listed properties.

1.5 Operational Model

We now describe the operational model. Assume that a filter is already generated and installed on the source nodes. An initial and trivial filter $F_0$ can be used for this purpose, where $\forall X \in D$, $F_0(X) = 0$. In other words, $F_0$ passes every data item it receives, without dropping any. During the time between the installation of the last filter and the decision to replace it, the CQ server performs the following two major functionalities for the purpose of adaptation: performance monitoring and sample collection.

First, the CQ server monitors the performance of the system with respect to how well it is performing in consuming all the incoming data items (possibly filtered at the source nodes). Based on this, it maintains a throttler parameter denoted by z. The value of the throttler parameter is in the range [0, 1] and defines the fraction of the aggregate source stream volume that can be processed without dropping any data items. Here, aggregate source stream volume refers to the total volume of the source streams before any filtering is applied. When the throttler value drifts beyond a system specified threshold, relative to the throttler value that was used during the construction of the last installed filter, it is decided that a new filter should be constructed. The maintenance of the throttler is discussed in detail later in Section 5.

Second, the CQ server collects a small number of sample data items. We denote this set by U. On the source nodes, these sample items are marked and are not processed by the filter, so as not to bias the perceived data distribution at the CQ server. These samples are always forwarded to the CQ server. A sampling fraction, denoted by $\sigma$, is used to define the size of the set U. This sample set is later used by the CQ server to construct a filter for maximizing the QoS of the system. For instance, one of the major uses of the sample set during filter construction is to approximate the normalized frequencies of the data items, denoted by $f(X)$ for a data item $X \in D$. Section 4 gives further details on the computation of these frequencies. They are particularly useful in calculating the completeness of queries under a given filter F. Concretely, for a query $q_i \in Q$, we have:

$$C(q_i) = \frac{\int_{X \in R(q)} (1 - F(X)) \cdot f(X) dX}{\int_{X \in R(q)} f(X) dX} \quad (1)$$

Equation 1 computes the ratio of the query $q_i$'s result size under filter F to the query result size under no shedding assumption and with trivial filter $F_0$.

Once the performance monitoring process decides that a significant change in the throttler has taken place, and enough number of samples are selected by the sample collection process, a new filter is constructed. Note that the focus of adaptation is on rate-bursts, since the throttler fraction depends on the rate changes. However, once a new filter is constructed, the possible changes in data item distribution are also taken into account while constructing the new filter. The assumption here is that, the rate changes happen in a much smaller time scale, compared to the changes in data item distribution.

Figure 2:
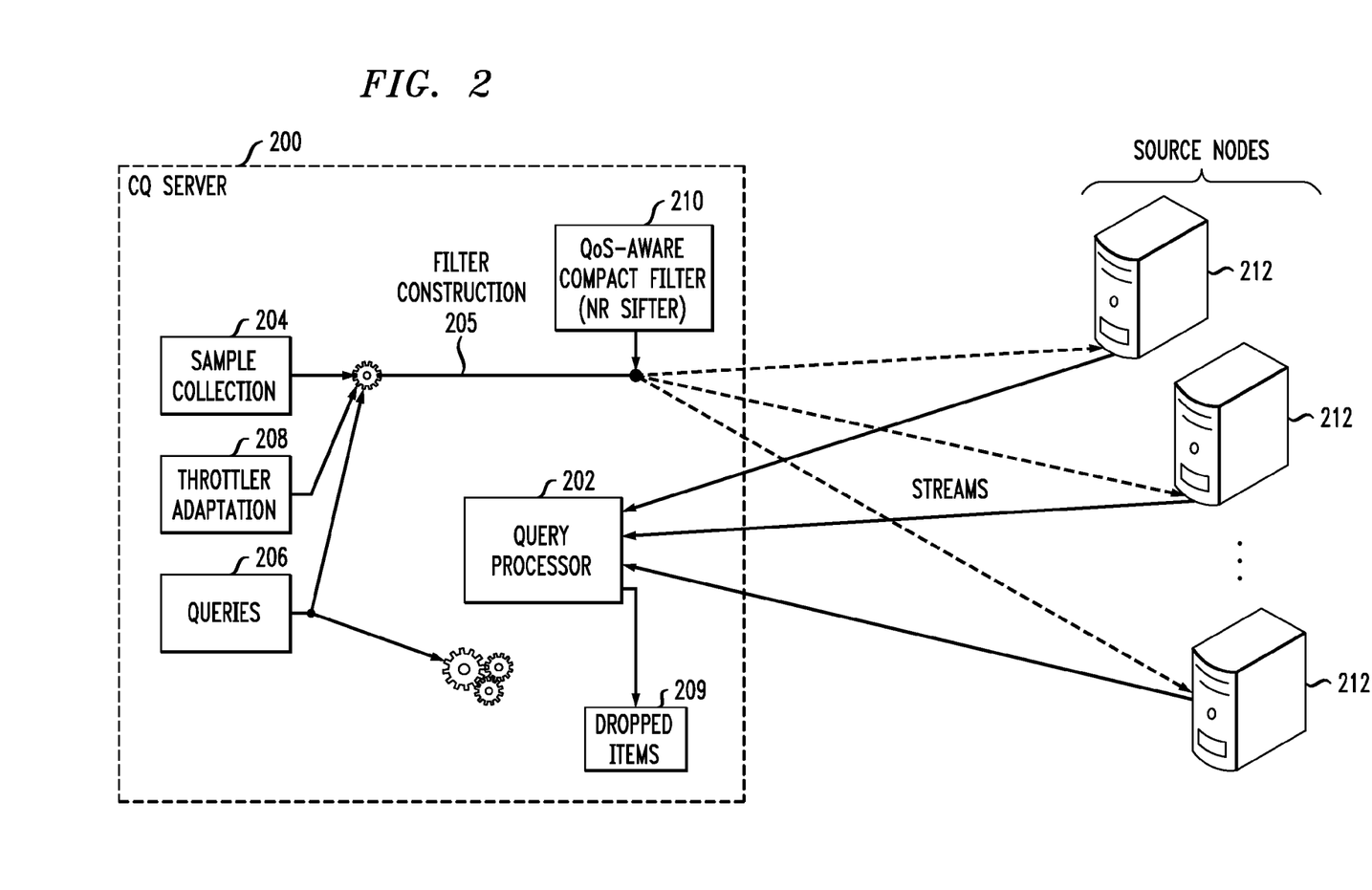
FIG. 2 illustrates a data stream processing system according to an embodiment of the present invention.

FIG. 2 illustrates an overview of the operational model by way of a block diagram of a sample data stream processing system. As shown, CQ server 200 receives queries 206 from one or more clients (not shown). The server performs filter construction 205 based on sample collection 204, queries 206 and throttle adaptation 208. The NR sifters 210 are sent to the data sources (source nodes 212). At the source nodes the NR sifters filter the respective data streams such that query processor 202 can process the queries based on the filtered data streams. Dropped items are denoted as 209. Note that in FIG. 2 the same filter is used for all source streams. Extension to multiple source filters is discussed in Section 6.

2. Basic Problem Definition

In this section, we define the basic problem of optimal filter construction. Given the throttler z, the item frequencies f, and the set of queries Q, our aim is to find the best filter F*, that is F*←BestFilter(z, f,Q). We define "the best" as the filter that provides the highest overall QoS, i.e., F*←argmax$_F$ V*(F, f,Q). Here, V* denotes the overall QoS. For brevity, we use V*(Q) and omit the other parameters. V*(Q) is defined as:

$$V^*(Q) = \sum_{q_i \in Q} w_i \cdot V(q_i) \qquad (2)$$

Note that $V(q_i)$ is dependent on F and f, by way of completeness function $C(q_i)$.

Furthermore, the filter F* has to satisfy the processing constraint. That is, it should reduce the aggregate volume of the data items received at the CQ server to z times of its original value. The processing constraint is aimed at avoiding random dropping of data items, by matching the rate at which the data items arrive at the CQ server to the data item processing rate of the CQ server. We state the processing constraint as follows:

$$1-z = \int_{X \in D} F(X) \cdot f(X) dX \qquad (3)$$

The term 1−z on the lefthand side of the processing constraint is the fraction of the data items we need to drop. The righthand side is the fraction of data items dropped by the filter F. The integration in Equation 3 can be converted to a sum for discrete domains.

Note that this formulation does not say anything about the compactness, fast lookup, or lightweight construction properties of the filter. These properties depend on the structure of the filter. So far we have not put any restrictions on how a filter can be represented, and described it as a black box. The next section deals with practical filter construction and presents a number of design choices targeted toward achieving these properties. We revisit the basic problem formulation after we present our filter design (see Section 3.3).

3. Practical Filter Construction

In this section, we define a filter as a set of sifter regions. Under this illustrative definition, we show how the optimal filter configuration can be determined using the concept of query consolidation. Sifter regions enable us to create compact filters, whereas query consolidation makes it possible to optimally and quickly configure these filters.

3.1 Sifter Regions

We structure a filter as a non-overlapping and complete partitioning of the data domain D. As a result, a filter consists of a set of sifter regions, denoted by S={$S_i$}, i∈[1 ... l], l is the number of sifter regions and defines the granularity of the filter. We have $\cup_{S_i \in S} S_i = D$ and $\forall_{\{S_i, S_j\} \subset S} S_i \cap S_j = \emptyset$. We associate with each sifter region, a single drop threshold, denoted by $d(S_1)$ for region $S_i \in S$. Thus, we have:

$$\forall X \in S_i, F(X) = d(S_i) \qquad (4)$$

Equation 4 simply states that the filter F will drop a data item X with probability $d(S_i)$, where $S_i$ is the sifter region that contains the data item X.

Note that the number of regions and drop thresholds, i.e., parameter l, impacts the compactness of a filter as well as its performance. The larger the l, the more fine grained is the filter, and thus the better the QoS. Yet, increasing l too much will defy the compactness requirement, and will increase the construction and lookup times.

Sifter regions also enable low-overhead evaluation of drop decisions at the source nodes, once the drop threshold for a given data item is looked up from the filter. Concretely, a source node maintains l counter pairs, counting the number of items dropped and produced for each sifter region. If sending a newly produced item causes the ratio of these two counters to go below the drop threshold of the corresponding region, then the item is simply dropped. No random number generators are needed.

3.1.1 Construction vs. Configuration

Given the definition of sifter regions and drop thresholds, we make a subtle but important distinction between filter construction and filter configuration. Constructing a filter involves: (i) defining the sifter regions, which is performed by a partitioning algorithm; and (ii) setting the drop thresholds, which is performed by a filter configuration algorithm. We separate the sifter region partitioning form the drop threshold configuration. In this section, we deal with the optimal filter configuration problem, given that the sifter regions are already defined. The separation of the two sub-problems means that the optimality of the filter configuration does not necessarily imply optimality of the filter itself. The partitioning algorithms are later discussed in Section 4 and are heuristic in nature.

3.1.2 Query Completeness with Sifter Regions

We now extend the query completeness definition to use sifter regions. For this purpose we introduce a number of new notations. $f(S_i)$ denotes the aggregate frequency of the items within region $S_i$ and is formally defined as $\int_{X \in S_i} f(X) dX$. The frequencies for regions are calculated from the observed samples by the partitioning algorithms discussed in the next section.

Given a query $q_i \in Q$, we use $S(q_i)$ to denote the set of sifter regions that the region $R(q_i)$ of the query intersects with. Formally, we have $S(q_i) = \{S_j : S_j \cap R(q_i) \neq \emptyset \wedge S_j \in S\}$. With this definition at hand, we define the contribution of a sifter region $S_i$ to the completeness of a query $q_i$, denoted by $C(q_i, S_i)$, as follows:

$$C(q_i, S_j) = (1 - d(S_j)) \cdot \frac{f(S_j) \cdot |S_j \cap R(Q_i)| / |S_j|}{\sum_{S_k \in S(q_i)} f(S_k) \cdot |S_k \cap R(q_i)| / |S_k|} \qquad (5)$$

The denominator of Equation 5 is an approximation of the frequency of items that match the query $q_i$. The approximation is due to the assumption that the data item frequency is uniform within a sifter region. Since only the sifter region frequencies are known, the volume of the query region $R(q_i)$'s intersection with the sifter regions in $S(q_i)$ are used to scale the frequencies. |.| notation is used to denote region volumes. Similarly, the numerator is an approximation of the frequency of data items that match the query $q_i$ and are from the sifter region $S_i$. The $1-d(S_i)$ term on the left is the fraction of the matching data items that are passed through the filter and completes the definition.

The completeness of a query $q_i \epsilon Q$ can then be easily defined as the sum of individual contributions from the set of sifter regions that intersect the query region. More formally, we have $C(q_i) = \Sigma_{S_j \epsilon S(q_i)} C(q_i, S_k)$.

3.2 Query Consolidation

Recall that the overall QoS metric from Equation 2 contains one term for each query. This translates into increased time spent for finding the optimal filter configuration. Given that the total number of queries is expected to be much larger than the number of sifter regions, i.e., $|Q| \gg 1$, reducing the number of terms in $V^*(Q)$ from $|Q|$ to 1 will provide a much simpler objective function. We achieve this via query consolidation. Before explaining the details, we first define a useful notation that will be used for explaining query consolidation. Let $Q(S_i)$ denote the set of queries that intersect the sifter region $S_i \epsilon S$. Formally, we have $Q(S_i) = \{q_i : S_i \cap R(q_i) \neq \emptyset \hat{} q_j \epsilon Q\}$. Note that the notations $Q(S_i)$ and $S(q_i)$ are duals of each other.

Query consolidation involves two logical steps: (i) decomposing the QoS of each query into a number of additive components, one per intersected sifter region, and (ii) for each sifter region, consolidating the QoS components of different queries that intersect the region into a single QoS value.

Using the query completeness formulations from Section 3.1.2, we decompose the QoS value $V(q_i)$ as:

$$V(q_i) = \beta_i + \alpha_i \cdot \sum_{S_j \in S(q_i)} C(q_i, S_j) \tag{6}$$

Plugging Equation 6 into the overall QoS definition $V^*(Q)$ from Equation 2, we get:

$$V^*(Q) = \sum_{q_i \in Q} w_i \cdot \beta_i + \sum_{q_i \in Q} \sum_{S_j \in S(q_i)} \alpha_i \cdot w_i \cdot C(q_i, S_j) \tag{7}$$

In Equation 7 we can perform a rotation of the two summations, making note of the property that $\forall q_i \epsilon Q, \forall S_i \epsilon S(q_i) \equiv \forall S_j \epsilon S, \forall q_i \epsilon Q(S_j)$. The aim is to group the terms in the equation by regions first, instead of by queries. This yields:

$$V^*(Q) = \sum_{q_i \in Q} w_i \cdot \beta_i + \sum_{S_j \in S} \sum_{q_i \in Q(S_j)} \alpha_i \cdot w_i \cdot C(q_i, S_j) \tag{8}$$

We represent the $$\sum_{q_i \in Q(S_j)} \alpha_i \cdot w_i \cdot C(q_i, S_j)$$

term in Equation 8 by $A(S_i)$ and refer to it as region QoS. Similarly, we use B to denote the $$\sum_{q_i \in Q} w_i \cdot \beta_i$$

term. It is important to note that by a single scan over the set of queries, all A's (region QoSs) and B can be computed. The computational complexity of region QoS calculation is given by $O(|Q| \cdot l)$ in the general case. Calculation of region QoSs is a one time operation during filter configuration. After it is performed, the overall QoS value can be expressed as a simple linear function of the drop thresholds. As a result, repeated calculation of $V^*(Q)$ with different drop thresholds during filter configuration is now an inexpensive operation, with complexity $O(l)$. Finally, using the new notation, we get:

$$V^*(Q) = B + \sum_{S_j \in S} (1 - d(Sj)) \cdot A(Sj) \tag{9}$$

Equation 9 completes the discussion of query consolidation. It replaces Equation 2 as the objective function.

3.3 Problem Reformulation

Figure 3:
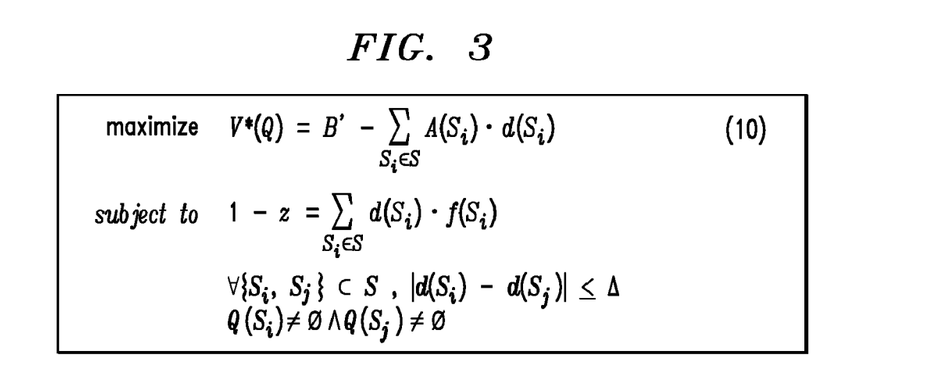
FIG. 3 illustrates a filter configuration methodology according to an embodiment of the invention.

We now re-formulate the optimal filter configuration problem, using the concepts of sifter regions and associated drop thresholds. For brevity we further define $B' = B + \Sigma_{S_j \in S} A(S_i)$ and state the problem as follows:

$$\text{maximize} \quad V^*(Q) = B' - \sum_{S_i \in S} A(S_i) \cdot d(S_i) \tag{10}$$

$$\text{subject to} \quad 1 - z = \sum_{S_i \in S} d(S_i) \cdot f(S_i)$$

$$\forall \{S_i, S_j\} \subset S, |d(S_i) - d(S_j)| \leq \Delta$$

$$Q(S_i) \neq \emptyset \wedge Q(S_j) \neq \emptyset$$

The filter configuration problem is also shown in FIG. 3.

It is easily noticed that this is a linear program (LP), where drop thresholds are the problem variables. The processing constraint (the first constraint in Equation 10) is adapted from Equation 3 to use region frequencies and region drop thresholds. More importantly, we introduce a number of new constraints called fairness constraints. The fairness constraints state that the drop thresholds of any two regions that are non-empty with respect to queries, can not differ by more than a threshold $\Delta \epsilon [0, 1]$. We refer to $\Delta$ as the fairness threshold. The aim of the fairness threshold is to ensure that the completeness of queries do not drift beyond a threshold, so that we do not end up increasing the overall QoS at the expense of diminishing the completeness and thus the QoS of some queries.

Without the fairness constraints, the problem is a fractional knapsack one, and as a result the drop threshold $d(S_i)$ of the sifter region $S_i$ with the lowest region QoS value $A(S_i)$ will be increased as much as possible to meet the processing constraint. When the drop threshold reaches to 1, the sifter region with the next smallest region QoS will be increased, and so on. In the generic problem, the fairness threshold can be set to 1 to represent this special case. However, in most applications it is desirable to set a fairness threshold to allow more balanced degradation in QoS of the queries, as the throttler z decreases (more load is shed). In the other extreme case of $\Delta = 0$, the scheme reduces to $l = 1$. The latter is equivalent to random dropping, with the exception that the dropping of data items will be performed at the source nodes using the filter, not at the CQ server end.

3.4 Query Transformation

We now describe the details of query transformation. Recall that a query $q_i$ is defined as a set of terms in the form <attribute> <op> <constant>, where <op>∈{=,≤,≥,<,>}, combined into a query expression using logical operators {∧,∨,¬}. We will decompose this query expression into a set $Q(q_i)=\{q_{i_1},\ldots,q_{i_j},\ldots,q_{i_m}\}$ of queries, such that the queries in $Q(q_i)$ can be installed in the system as n-dimensional range queries with same QoS parameters with the original query $q_i$, but with a different set of weights, $w_{i_j}$ for $q_{i_j} \in Q(q_i)$ This involves six simple steps to convert $q_i$ to a disjunction of n-dimensional queries, and two additional steps to decompose the query into a set of non-overlapping n-dimensional queries with proper weights. The first six steps of the transformation are:

i) Push the negation operations in the query expression down to the individual terms.

ii) Remove the negations by changing the term operator (in the case of $\neg(x=c)$, convert to $x > c \vee x < c$).

iii) Convert the query expression into disjunctive normal form, i.e., disjunction of one or more conjunctive components (conjunctions of terms).

iv) For each conjunctive component, convert the set of terms corresponding to the same attribute into a range condition term. E.g., $x > c_1 \wedge x \leq c_2 \equiv x \in (c_1, c_2]$, if $c_1 < c_2$ ($\equiv \emptyset$ otherwise).

v) For each conjunctive component, if there is no term for an attribute, add a range condition term with the attribute domain as the range. For example, $x_i \in D_i$ if $x_i$ is missing in the conjunctive component.

vi) For each conjunctive component, collocate the range conditions for different attributes into a single n-dimensional range condition, e.g., $x_1 \in R_1 \wedge x_2 \in R_2 \equiv X \in R_1 \times R_2$.

The additional two steps of the query transformation are related with weight adjustment. First we separate out each range term in the transformed query and make it an individual range query. These queries are then further decomposed to yield the final set $Q(q_i)$ of queries with the property $\forall \{q_{i_j}, q_{i_k}\} \subset Q(q_i), R(q_{i_j}) \cap R(q_{i_k}) = \emptyset$. In other words, the final set of queries are non-overlapping. This property plays an important role in adjusting the weights of the queries in $Q(q_i)$. In particular, we set:

$$w_{i_j} = w_i \cdot \frac{f(R(q_{i,j}))}{\sum_{k=1}^{m} f(R(q_{i,k}))} \quad (11)$$

It is easy to see that this formulation keeps the overall QoS intact after the decomposition.

More concretely, we have:

$$w_i \cdot V(q_i) = w_i \cdot (\beta_i + \alpha_i \cdot C(q_i)) \quad (12)$$

$$= w_i \cdot \left( \beta_i + \alpha_i \cdot \frac{\sum_{j=1}^{m} f(R(q_{i,j})) \cdot C(q_{i,j})}{\sum_{j=1}^{m} f(R(q_{i,j}))} \right)$$

$$= \sum_{j=1}^{m} w_i \cdot \frac{f(R(q_{i,j}))}{\sum_{j=1}^{m} f(R(q_{i,k}))} (\beta_i + \alpha_i \cdot C(q_{i,j}))$$

$$w_i \cdot V(q_i) = \sum_{j=1}^{m} w_{i_j} \cdot V(q_{i_j})$$

Note that the derivation of Equation 12 depends on the queries in $Q(q_i)$ being non-overlapping.

4. Partitioning Algorithms

In this section, we describe a number of partitioning schemes that can be used to determine sifter regions. The first three of these schemes are:

Uniform Grid partitioning divides the data space into l equi-sized sifter regions, $\forall_{i,j \in [1 \ldots l]}, |R(S_i)|=|R(S_j)|$.

Data Equi-depth partitioning divides the data space into l sifter regions, such that the data frequency is same for all regions, $\forall_{i,j \in [1 \ldots l]}, f(S_i)=f(S_j)$.

Query Equi-depth partitioning divides the data space into l sifter regions, such that the query density is same for all regions (the center points of query regions are used as data to construct this partitioning).

Uniform grid partitioning is relatively easy to build, requiring only O(l) time. It requires O(n) time for lookup, since for a given data item the index of the grid cell containing it on a given dimension can be found in constant time. O(n·|U|) time is needed to use the sample set U to compute the region frequencies that are needed for filter configuration. The major advantage of uniform grid partitioning is its small build time complexity. However, when the data distribution is skewed, most of the grid cells will be wasted (zero frequency regions), reducing the effectiveness of the filter.

Data equi-depth partitioning uses the sample set U to build the sifter regions. This is achieved by sorting the sample data items in U along the first dimension and dividing the set of samples into u equi-sized subsets of consecutive items ($l=u^n$) and generating one partition from each subset. The same procedure is then repeated for the resulting partitions, using a different dimension. After all n dimensions are iterated, the resulting set of partitions corresponds to the sifter regions. This process takes O(n·|U|·lg|U|) time. The lookup requires O(n·lg l) time, since one binary search is needed to locate the index of the matching region, for each dimension. Note that data equi-depth partitioning does not suffer from data skewness. On the down side, it fails to take into account query skewness.

Building a query equi-depth partitioning follows the same procedure as data equi-depth partitioning. However, since query distribution is used for building a query equi-depth partitioning, an additional post step is needed to calculate the data item frequencies. This post step takes O(n·lg l·|U|) time, since one lookup is needed for each data item in |U|.

All three approaches lead to filters that require O(l) space, with the restriction that $l=u^n$, where $u \in N^+$. Since we aim at small number of regions, this is a limiting factor. In what follows, we present a flexible partitioning algorithm, that not only can approximate the three basic approaches described so far with arbitrary l, but also can be used to create more elaborate schemes.

4.1 Flexible Partitioning

The idea behind flexible partitioning is to start with the complete data space and progressively increase the granularity of the partitioning via: (i) picking the existing partition that provides the highest partitioning benefit; and (ii) generating two new partitions from it by dividing along the best division point and dimension. Different metrics used to determine the partitioning benefit, as well as division point and dimension lead to alternative partitioning schemes. For instance, the first two partitioning schemes described so far can be approximated, for arbitrary l, as:

Uniform Grid Approximation
  Partitioning benefit: volume of the partition
  Division point and dimension: mid-point, on the dimension of the longest edge Data Equi-Depth Approximation Partitioning benefit: number of sample data items in the partition Division point and dimension: point that equally distributes the sample data items, on the dimension of highest variance

4.2 Partitioning with QDPart

We now describe a flexible partitioning algorithm referred to as QDPart. The main idea behind QDPart is to make use of both data and query distributions within a partition to determine the partitioning benefit. For this purpose, QDPart uses additional information about the sample data items in U. Concretely, for each data item in U, we associate a hit value that gives the number of queries that this point satisfies. Such information is already available from the query evaluation component, since all sampled data items are processed by the CQ server. We consider a partition as a good choice for further partitioning along a given dimension if. (i) it contains sample data items that are scattered along the given dimension; and (ii) it contains sample data items with highly varying hit values.

To compute the partitioning benefit of a given partition S with QDPart, we consider all n dimensions and pick the one that provides the highest benefit. Given dimension $i \in [1 \ldots n]$, and denoting the sample data items in S' as U', we calculate the partitioning benefit as follows. We first calculate a diversity metric for dimension i and partition S', defined as the product of two terms: (i) SSE of the hit values of data items in U' and (ii) SSE of the positions of data items in U' on dimension i, where SSE represents sum of squared errors. We denote this value by H(S', i), and refer to it as roof diversity. It represents the diversity within the partition S' along dimension i, with respect to query hit values and positions of data items. We then sort the set of sample data items in U' along dimension i. After the sort, there are |U|-1 possible partitionings of S'. The jth partitioning will have items indexed [1 . . . j] in the first sub-partition denoted by $S'_{j-}$ and the items indexed [j+1 . . . | U'|] in the second sub-partition denoted by $S'_{j+}$. Among these alternatives, we pick the one that has the smallest sum of diversity metrics from two partitions, i.e. smallest $H(S'_{j-},i)+H(S'_{j+},i)$ value. We refer to this value as floor diversity. The difference between the roof and floor diversity values gives the benefit of partitioning S' along dimension i. More formally:

$$\text{benefit}(S')=\max_{i \in [1 \ldots n]}(H(S'_{j},i)-\min_{j \in [1 \ldots |U'|]}(H(S'_{j-},i)+H(S'_{j+},i))) \quad (13)$$

Figure 4:
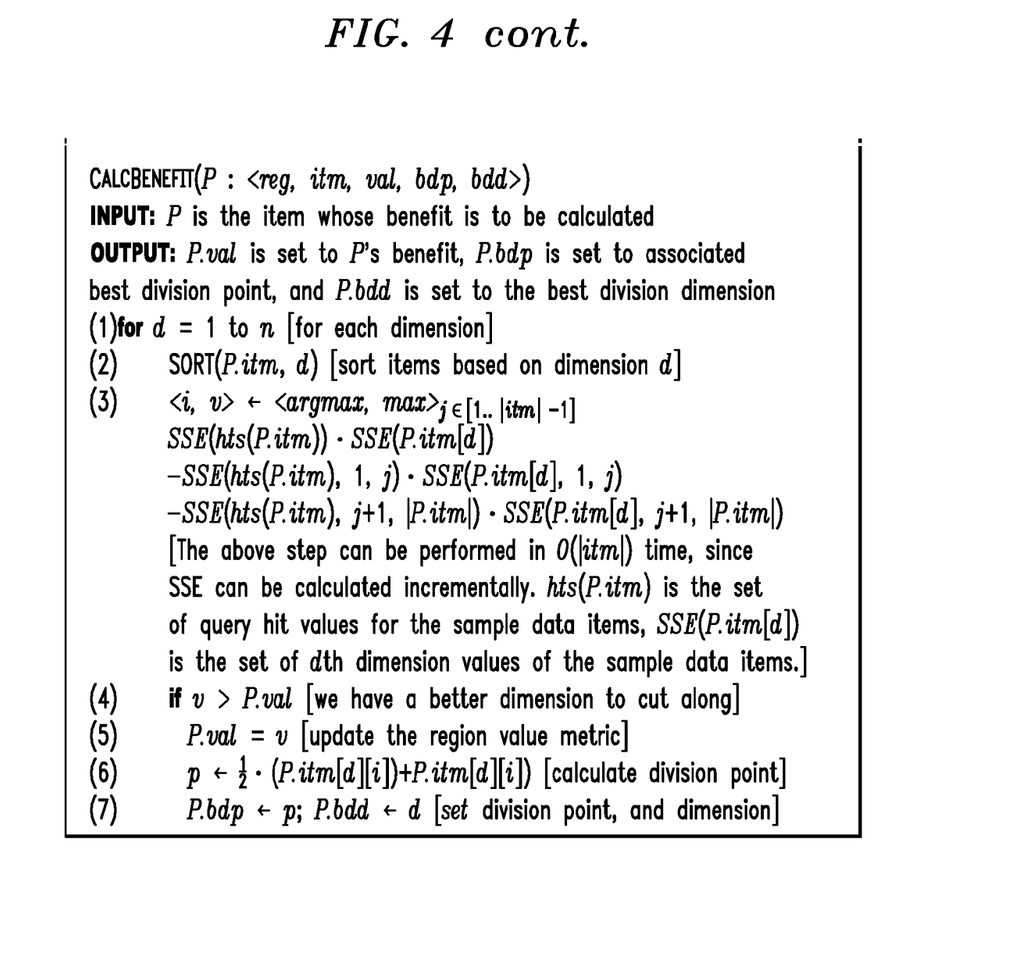
FIG. 4 illustrates a partitioning methodology according to an embodiment of the present invention.

The QDPart algorithm can be adapted to use different diversity metrics by replacing the H function. Note that we made use of SSE in defining the diversity function H. Since SSE can be incrementally calculated, only two scans are needed after sorting the sample items along one of the dimensions to calculate the roof and floor diversities. As a result, the benefit value for partition S' can be computed in $O(n \cdot |U'| \cdot \lg |U'|)$ time. This yields a worst case complexity of $O(n \cdot l \cdot |U| \cdot \lg |U|)$ for the complete QDPart algorithm. Pseudo-code of QDPart is given by Algorithm 1 in FIG. 4.

4.3 Illustrative Examples

Figure 5:
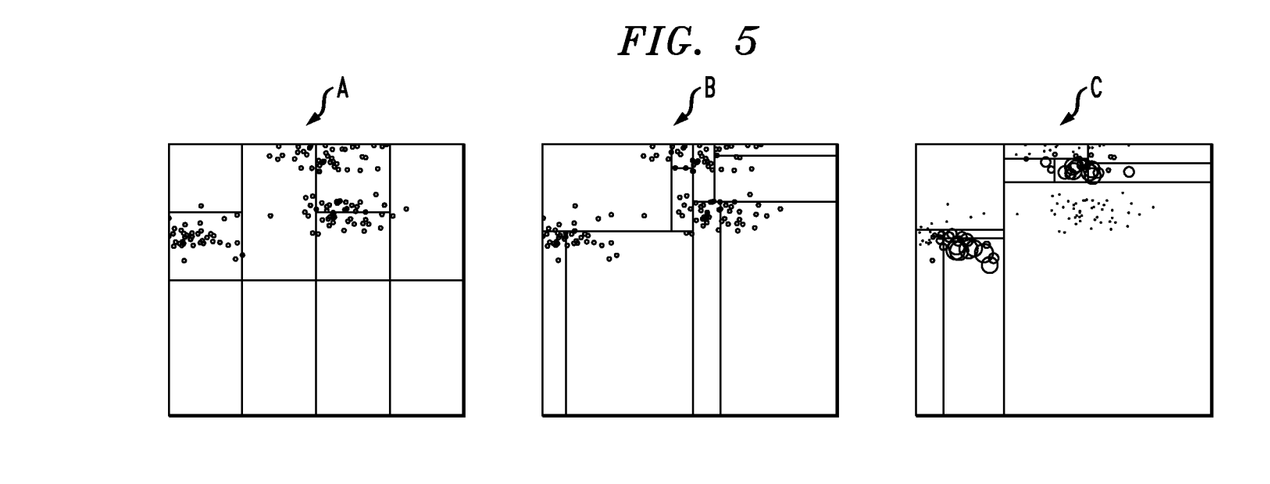
FIG. 5 illustrates partitioning approaches according to embodiments of the present invention.

FIG. 5 gives examples of flexible partitioning, for l=10 and n=2. In order, from left to right, we have uniform grid (A) and data equi-depth (B) approximations, and QDPart partitioning (C). For the first two, the sample data items are shown as fixed-size circles. For the QDPart partitioning, the size of the circles are adjusted based on the number of hits each sample data point has. Observe that, the uniform grid approximation is not perfect, but has the property that the biggest sifter region has at most twice the space volume of the smallest one. On the other hand, data equi-depth approximation has the property that the most populous sifter region has at most twice the data item frequency of the least populous one. QDPart partitioning, on the other hand, tries to group together sample data items that are close both spatially and in terms of their hit counts (represented by circle size in the figure).

5. Throttler Adaptation

In this section, we describe throttler adaptation, which is aimed at adjusting the throttler z in the face of changing and possibly bursty incoming aggregate stream rates. Recall that the throttler, $z \in [0 \ldots 1]$, defines the fraction of the aggregate source stream volume that can be processed by the CQ server. Without adaptation, the throttler value we use is either an undershoot or an overshoot, with respect to its ideal value, say $z^*$. In the overshoot case, $z > z^*$, the CQ server will receive data items at a rate higher than it can process, and as a result some portion of the stream will be randomly dropped. A higher fraction of the stream that is randomly dropped implies an increased loss of opportunity in terms of overall QoS, due to increased amount of random dropping taking place instead of more intelligent filter-based dropping. In the undershoot case, $z < z^*$, the CQ server will receive data items at a rate lower than the maximum it can handle, even though there are more items to process that are being dropped at the source nodes by the installed filters. Thus, throttler adaptation is critical in highly dynamic scenarios.

Here we provide a brief overview of a formula used to update the throttler, via performance monitoring. Concretely, we observe the CQ server's input queue and periodically decide the fraction of the original aggregate stream that should be retained, i.e., we set a new throttler z. The aim is to reduce the system load so that the rate at which the data items are received ($\lambda$) and the rate at which these items are processed ($\mu$) are balanced to prevent dropping items from the input queue. The utilization of the CQ server, denoted by $\rho$, is given by $\lambda/\mu$. Assume that the CQ server's input queue can hold at most B data items. We set z such that the average queue length is no more than the maximum queue size. Assuming M/M/1 queuing model, this requires: $\rho=1-1/B$. If the utilization is larger than $1-B^{-1}$, then we have an overload situation and thus the throttler z should be decreased. On the other hand, if the utilization is smaller than $1-B^{-1}$, then we have an underutilized CQ server and the throttler z should be increased if it is not already 1. This leads to the following rule to update z, denoting the last value of the throttler by z':

$$z \leftarrow \min\left(1, z' \cdot \frac{B-1}{\rho \cdot B}\right) \quad (14)$$

6. Extensions

In this section we discuss a number of possible extensions to the illustrative approaches described above, including multiple source filters, categorical attributes, and complex queries.

Multiple source filters: We use the same filter for all source nodes and streams. However, different source streams may have different data distributions and thus can benefit from specialized filters. We can extend our approach to this scenario, by performing query consolidation for each filter to be generated and modifying the processing constraint to integrate drop variables from all filters. This will increase the number of variables in the problem to the number of sifter regions times the number of sources. For large number of sources, this may result in a high filter construction overhead. To alleviate this, source nodes that have similar data distributions can be grouped together to share filters.

Categorical attributes: So far we assumed that all attributes are numerical. However, our approach can be extended to accommodate categorical attributes, provided that there exists a generalization hierarchy over the categorical values. Such a generalization hierarchy will define the partitioning constraints along the dimension representing the categorical attribute. Generalization hierarchies are commonly used in k-anonymity research.

Complex type of queries: Above we only considered queries that can be transformed into disjunction of terms that are in the form of $X \in R(q)$, where $q \in Q$. We noted in Section 1.2 that other query types can also be supported. Here we briefly mention one such query type, namely linear queries in the form of $a_{j_l} \leq \Sigma_{i=1}^n c_i \cdot x_i \leq a_{j_h}$ (in matrix notation $c \cdot x^T \in [a_{j_l}, a_{j_h}]$). Such a query can express linear relationships between different attributes. In two dimensions, it corresponds to the space between two parallel lines, and in n-dimensions it corresponds to the space between two parallel hyperplanes. Especially for two and three dimensions, the intersection of these spaces with the sifter regions can be computed easily. As a result, such queries can be supported without significant modifications to the system architecture.

7. Illustrative CQ Server

Figure 6:
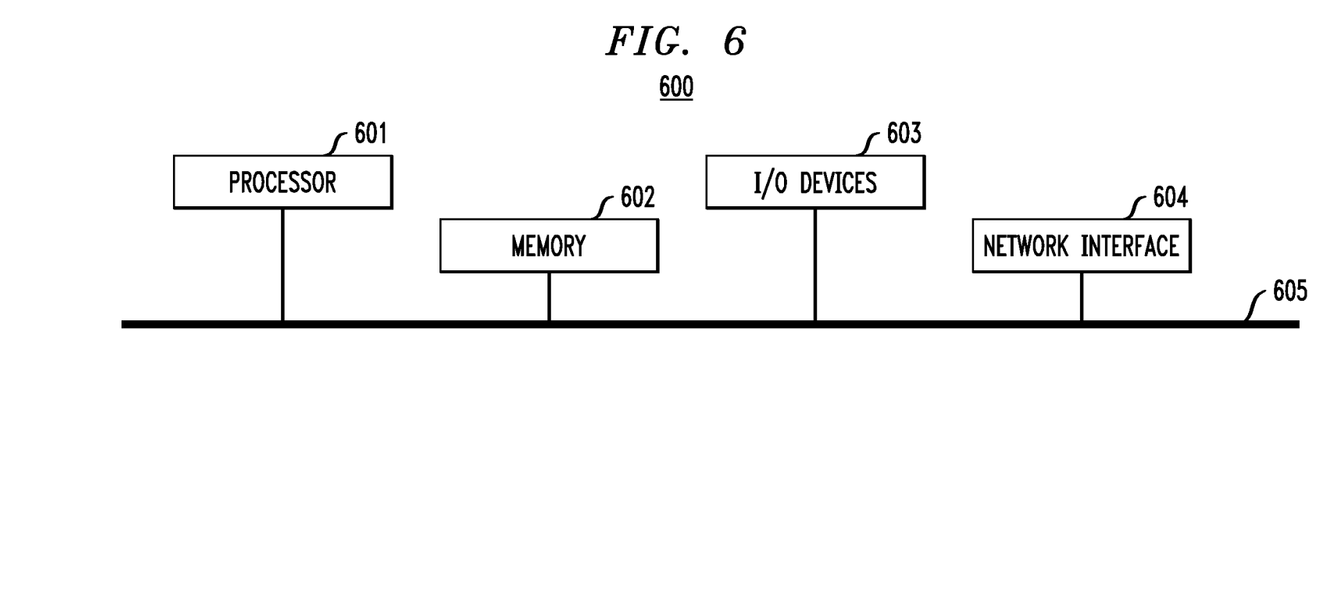
FIG. 6 illustrates a computer architecture of a CQ server according to an embodiment of the present invention.

Referring lastly to FIG. 6, a computer system is illustrated wherein techniques for adaptive source filtering and load shedding may be implemented according to an embodiment of the invention. That is, FIG. 6 illustrates a computer system in accordance with which one or more components/steps of the adaptive source filtering and load shedding techniques (e.g., components and methodologies described above in the context of FIGS. 1 through 5) may be implemented, according to an embodiment of the invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 6 may represent one or more CQ servers or one or more other processing devices capable of providing all or portions of the functions described herein. Alternatively, FIG. 6 may represent one or more data sources.

As shown, computer system 600 includes processor 601, memory 602, input/output (I/O) devices 603, and network interface 604, coupled via a computer bus 605 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in filtering data in a distributed data stream processing system, wherein a server receives and processes one or more data streams from one or more data sources, the method comprising the steps of:

the server periodically re-configuring one or more filters and sending the one or more periodically re-configured filters to the one or more data sources such that the one or more data sources are configured to perform data filtering based on the one or more periodically re-configured filters received from the server;

wherein the step of the server periodically re-configuring the one or more filters further comprises the steps of:

defining a plurality of non-overlapping regions of a data space associated with at least one of the one or more filters; and determining a respective drop threshold for each of the non-overlapping regions within the filter, at least a first region having a different drop threshold than at least a second region, wherein a drop threshold defines a probability that an item will be dropped at a data source when the filter is applied.

2. The method of claim 1, wherein the step of the server defining non-overlapping regions of the data space for the filter further comprises the step of partitioning the data space of the filter into a given number of regions.

3. The method of claim 2, wherein the given number of regions are equally sized.

4. The method of claim 2, wherein, for the given number of regions, a data frequency is the same.

5. The method of claim 2, wherein, for the given number of regions, a query density is the same.

6. The method of claim 2, wherein, for the given number of regions, a partition benefit is maximized.

7. The method of claim 1, wherein the step of the server determining a respective drop threshold for each region within the filter further comprises the steps of:

consolidating queries intersecting each filter region into one quality-of-service (QoS) value region; and formulating the drop threshold determination step into an optimization problem.

8. The method of claim 7, wherein the step of consolidating queries further comprises the steps of:

decomposing the QoS value of each query into one or more additive components, each component per intersected filter region; and for each filter region, consolidating the QoS components of different queries that intersect the region into a single QoS value.

9. The method of claim 7, wherein the step of formulating the optimization problem further comprises the steps of:

setting an objective function to an aggregate of the QoS values of the region; and setting constraints such that the total fraction of a load shed using the drop thresholds equals a pre-calculated throttler value.

10. The method of claim 9, wherein the throttler value is pre-calculated by the steps of:

monitoring a system utilization since a last adaptation step;

monitoring a fraction of dropped data items; and using the monitoring steps to compute a fraction of the load that can be handled, wherein the computed fraction is the throttler value.

11. An article of manufacture for use in filtering data in a distributed data stream processing system, comprising computer readable storage medium containing one or more programs which, when executed by a computer, performs the steps of claim 1.

12. Apparatus for use in filtering data in a distributed data stream processing system, wherein the apparatus receives and processes one or more data streams from one or more data sources, the apparatus comprising:

a memory; and a processor coupled to the memory and operative to periodically re-configure one or more filters and send the one or more periodically re-configured filters to the one or more data sources such that the one or more data sources are configured to perform data filtering based on the one or more periodically re-configured filters received from the processor, wherein the operation of periodically re-configuring the one or more filters further comprises:

defining a plurality of non-overlapping regions of a data space associated with at least one of the one or more filters; and determining a respective drop threshold for each of the non-overlapping regions within the filter, at least a first region having a different drop threshold than at least a second region, wherein a drop threshold defines a probability that an item will be dropped at a data source when the filter is applied.

13. The apparatus of claim 12, wherein the operation of the server defining non-overlapping regions of the data space for the filter further comprises partitioning the data space of the filter into a given number of regions.

14. The apparatus of claim 12, wherein the operation of determining a respective drop threshold for each region within the filter further comprises:

consolidating queries intersecting each filter region into one quality-of-service (QoS) value region; and formulating the drop threshold determination step into an optimization problem.

15. A query server, wherein the query server receives and processes one or more data streams from one or more data sources, the query server comprising:

a memory; and a processor coupled to the memory and operative to periodically re-configure one or more filters and send the one or more periodically re-configured filters to the one or more data sources such that the one or more data sources are configured to perform data filtering based on the one or more periodically re-configured filters received from the processor, wherein the operation of periodically re-configuring the one or more filters further comprises:

defining a plurality of non-overlapping regions of a data space associated with at least one of the one or more filters; and determining a respective drop threshold for each of the non-overlapping regions within the filter, at least a first region having a different drop threshold than at least a second region, wherein a drop threshold defines a probability that an item will be dropped at a data source when the filter is applied.

16. The query server of claim 15, wherein the operation of the server defining non-overlapping regions of the data space for the filter further comprises partitioning the data space of the filter into a given number of regions.

17. The query server of claim 15, wherein the operation of determining a respective drop threshold for each region within the filter further comprises:

consolidating queries intersecting each filter region into one quality-of-service (QoS) value region; and formulating the drop threshold determination step into an optimization problem.

18. The method of claim 1, wherein the server decides to re-configure a given one of the one or more filters by evaluating a filtering performance associated with the current configuration of the given filter and by evaluating an unfiltered sample of data received from the corresponding data source.

19. The method of claim 1, wherein the drop threshold for the first region and the drop threshold for the second region are each greater than zero and less than one.

20. The method of claim 1, wherein the server periodically re-configuring one or more filters comprises a comparison between a rate at which data items arrive at the server and a rate at which the server processes the data items.

* * * * *